(12) United States Patent
Reindl et al.

(10) Patent No.: US 7,356,050 B2
(45) Date of Patent: Apr. 8, 2008

(54) SYSTEM FOR TRANSMISSION OF DATA ON A BUS

(75) Inventors: Hartwig Reindl, Regensburg (DE); Gerhard Schmid, Köfering (DE)

(73) Assignee: Siemens Aktiengesellschaft, Munich (DE)

( * ) Notice: Subject to any disclaimer, the term of this patent is extended or adjusted under 35 U.S.C. 154(b) by 630 days.

(21) Appl. No.: 11/016,599

(22) Filed: Dec. 17, 2004

(65) Prior Publication Data

US 2005/0135331 A1    Jun. 23, 2005

Related U.S. Application Data

(60) Provisional application No. 60/530,389, filed on Dec. 17, 2003.

(30) Foreign Application Priority Data

Nov. 22, 2004  (DE)  .................. 10 2004 056 305

(51) Int. Cl.
*H04J 1/00* (2006.01)
(52) U.S. Cl. .................. 370/489; 701/1; 701/36
(58) Field of Classification Search ................ 370/489, 370/480, 464; 701/1, 36; 710/100, 305, 710/107

See application file for complete search history.

(56) References Cited

U.S. PATENT DOCUMENTS

| | | | |
|---|---|---|---|
| 5,142,430 | A | 8/1992 | Anthony |
| 5,909,350 | A | 6/1999 | Anthony |
| 6,018,448 | A | 1/2000 | Anthony |
| 6,097,581 | A | 8/2000 | Anthony |
| 6,157,528 | A | 12/2000 | Anthony |
| 6,282,074 | B1 | 8/2001 | Anthony |
| 6,331,926 | B1 | 12/2001 | Anthony |
| 6,373,673 | B1 | 4/2002 | Anthony |
| 6,388,856 | B1* | 5/2002 | Anthony ............... 361/106 |
| 6,469,595 | B2 | 10/2002 | Anthony et al. |
| 6,498,710 | B1 | 12/2002 | Anthony |
| 6,509,807 | B1 | 1/2003 | Anthony et al. |
| 6,522,516 | B2 | 2/2003 | Anthony |
| 6,549,389 | B2 | 4/2003 | Anthony et al. |
| 6,563,688 | B2 | 5/2003 | Anthony et al. |
| 6,580,595 | B2 | 6/2003 | Anthony et al. |
| 6,594,128 | B2 | 7/2003 | Anthony |
| 6,603,646 | B2 | 8/2003 | Anthony et al. |
| 6,606,011 | B2 | 8/2003 | Anthony et al. |
| 6,636,406 | B1 | 10/2003 | Anthony |
| 6,650,525 | B2 | 11/2003 | Anthony |

(Continued)

FOREIGN PATENT DOCUMENTS

AU              774310           12/2000

(Continued)

*Primary Examiner*—Ajit Patel
(74) *Attorney, Agent, or Firm*—Laurence A. Greenberg; Werner H. Stemer; Ralph E. Locher

(57) ABSTRACT

A system for transmitting data between a transmitter and a receiver on a communication network connecting a number of components, especially in a motor vehicle, has a CAN transceiver which converts logic signals into bus data signals downstream of each transmitter. A non-inductive symmetrical CAN filter is connected downstream of each CAN bus transceiver. The CAN filter has at least two impedances and it is preferably implemented as an X2Y capacitor.

7 Claims, 2 Drawing Sheets

U.S. PATENT DOCUMENTS

| | | |
|---|---|---|
| 6,687,108 B1 | 2/2004 | Anthony et al. |
| 6,738,249 B1 | 5/2004 | Anthony et al. |
| 6,806,806 B2 | 10/2004 | Anthony |
| 6,873,513 B2 | 3/2005 | Anthony |
| 6,894,884 B2 | 5/2005 | Anthony, Jr. et al. |
| 6,950,293 B2 | 9/2005 | Anthony |
| 6,954,346 B2 | 10/2005 | Anthony |
| 2003/0200017 A1* | 10/2003 | Capps et al. .................. 701/36 |
| 2005/0135331 A1* | 6/2005 | Reindl et al. ................ 370/351 |
| 2005/0285665 A1* | 12/2005 | Donaldson et al. .......... 327/530 |
| 2006/0017582 A1* | 1/2006 | Lockhart et al. .......... 340/636.1 |
| 2006/0098682 A1* | 5/2006 | Nichols ....................... 370/447 |
| 2007/0085133 A1* | 4/2007 | Kirchmeier et al. ........ 257/321 |

FOREIGN PATENT DOCUMENTS

| | | |
|---|---|---|
| DE | 691 20 063 T2 | 1/1997 |
| DE | 101 02 440 C1 | 5/2002 |
| DE | 203 19 863 U1 | 9/2004 |
| EP | 0 523 190 B1 | 1/1993 |
| JP | 2531557 B2 | 9/1996 |
| KR | 10-0385302 | 5/2003 |
| KR | 10-0449690 | 9/2004 |
| KR | 10-0488303 | 5/2005 |
| SG | 74572 | 6/2000 |
| SG | 76228 | 9/2000 |
| SG | 84832 | 11/2001 |
| SG | 85407 | 12/2001 |
| SG | 92042 | 9/2002 |
| SG | 95883 | 2/2003 |
| SG | 100205 | 7/2003 |
| WO | 91/15046 | 10/1991 |
| WO | 98/45921 | 10/1998 |
| WO | 99/37008 | 7/1999 |
| WO | 99/52210 | 10/1999 |
| WO | 00/65740 | 11/2000 |
| WO | 00/74197 A1 | 12/2000 |
| WO | 00/77907 A1 | 12/2000 |
| WO | 01/10000 A1 | 2/2001 |
| WO | 01/71908 A1 | 9/2001 |
| WO | 01/84581 A2 | 11/2001 |
| WO | 01/86774 A1 | 11/2001 |
| WO | 02/15360 A1 | 2/2002 |
| WO | 02/33798 A1 | 4/2002 |
| WO | 02/45233 A1 | 6/2002 |
| WO | 02/059401 A2 | 8/2002 |
| WO | 02/065606 A2 | 8/2002 |
| WO | 02/080330 A1 | 10/2002 |
| WO | 03/005541 A2 | 1/2003 |

* cited by examiner

SYSTEM FOR TRANSMISSION OF DATA ON A BUS

CROSS-REFERENCE TO RELATED APPLICATION

This application claims the benefit under 35 U.S.C. § 119(e), of U.S. Provisional Application No. 60/530,389, filed Dec. 17, 2003; this application also claims the priority, under 35 U.S.C. § 119, of German patent application No. 10 2004 056 305.5 filed Nov. 22, 2004; the prior applications are herewith incorporated by reference in their entirety.

BACKGROUND OF THE INVENTION

Field of the Invention

The invention relates to a system for transmitting data between a transmitter and a receiver on a communication network (bus) connecting a plurality of components, especially in a motor vehicle, with a so-called CAN transceiver that is disposed after each transmitter and converts logic signals (TxD, RxD) into bus data signals (CAN_H, CAN_L).

Motor vehicles often feature distributed control or processing units. Such distributed control and processing units are generally taken to be units which are arranged at different locations in the motor vehicle. These control and processing units, because they need to exchange data, are connected to each other wirelessly or using bus lines. In such arrangements for example control units or sensors arranged under the hood, in the transmission, in the doors, in tires etc. exchange data with each other and/or transmit such data to central processing units which analyze the received data using algorithms and activate the corresponding actuators.

The wired networking of control or processing units with sensor units and/or vice versa is normally implemented using bus systems. A bus system of this type is for example the well-known (CAN=Controller Area Network) bus. Special transmitter and receiver units or driver chips, in particular units known as transceivers, are provided for access to the bus transmission channel. Depending on how they are used, a distinction is made between a high-speed CAN with data rates of greater than 125 kbit/s up to 1 Mbit/s, e.g. for the drive train in the motor vehicle, and the low-speed CAN with data rates up to 125 kbit/s, for example 83 kbit/s, for the car body area.

With reference to FIG. 1, current bus systems in automotive engineering arrange a so-called CAN transceiver 1 after each transmitter. The CAN transceiver 1 converts logic signals (Tx), from a microcontroller for example, to the bus level and conversely converts received CAN bus signals (CAN_H, CAN_L) into logic signals (Rx) for evaluation in the microcontroller for example. The following phenomena are associated with these operations:

As a result of different technologies and the different switching behavior of the switching transistors (n-channel and p-channel MOSFETS) associated with them in the CAN transceiver 1 (see FIG. 2: n-channel FET switches CAN_H signals to supply voltage Vcc; p-channel FET switches CAN_L signals to ground (GND)) common mode noise is generated on CAN_H and CAN_L (see for example circled area "X" in FIG. 3).

These types of common mode noise on the CAN bus, caused in the final analysis by switching processes in the CAN transceiver 1 on switching of dominant to recessive (cf. in particular ISO 11898 CAN Specification, Physical Layer), are radiated via the connected bus lines and can lead to non-compliance with electromagnetic compatibility (EMC), especially to the emission of electromagnetic fields.

To minimize the effects of this common mode noise, common mode chokes 2 are presently used, especially when high-speed CANs are employed, that is with CAN bus speeds >125 kbit/s. The CAN user interface depicted in FIG. 1 shows a normal common mode choke 2 represented by a filter 2 which reduces the emission of electromagnetic fields over connected CAN bus lines (CAN_H and CAN_L) in a wiring loom.

Over and above this, suitable measures are used to ensure that the CAN module has a sufficient immunity to noise as regards conducted noise and radiated (field-induced) noise as well as sufficient electrostatic discharge (ESD) protection. Currently protection elements are also used—depending on the noise immunity required—(in particular varistors or additional EMC capacitors at the connector terminal pins).

SUMMARY OF THE INVENTION

It is accordingly an object of the invention to provide a system which overcomes the above-mentioned disadvantages of the heretofore-known devices and methods of this general type and which provides an improved transmission system that avoids the prior art disadvantages for transmission of data between a transmitter and a receiver on a communication path (bus) connecting a number of components in a motor vehicle. In particular common mode noise should be avoided and sufficient noise immunity should be guaranteed.

With the foregoing and other objects in view there is provided, in accordance with the invention, a system for transmitting data between a transmitter and a receiver on a communication network connecting a plurality of components, comprising:

at least one transmitter for transmitting data on the communication network;

a CAN bus transceiver connected following said at least one transmitter in a signal flow direction and configured to convert logic signals into bus data signals; and a symmetrical CAN filter connected following said CAN bus transceiver in the signal flow direction, said CAN filter having a non-inductive configuration and including at least two impedances.

The invention is particularly suitable for implementation in a motor vehicle.

The outstanding feature of the system in accordance with the invention for transmission of data between a transmitter and a receiver on a communication network (bus) connecting a number of components, especially in a motor vehicle, with a CAN transceiver which converts logic signals (TxD, RxD) into bus data signals (CAN_H, CAN_L) being arranged after each transmitter, is that a non-inductive design of symmetrical CAN filter which comprises at least two impedances (Zy1, Zy2) is arranged after the CAN bus transceiver.

The non-inductivity of the filter has the advantages of not being sensitive to the effects of offset voltages (ground offset) between different CAN users in the network during the CAN bus arbitration.

The symmetry of the impedances (Zy1, Zy2) of CAN_H to ground and CAN_L to ground is equally decisive as well as advantageous for the filter effect to suppress common mode noise on the bus.

Preferably the first impedance (Zy1) shorts the CAN-H line and the second impedance (Zy2) shorts the CAN-L line to ground (GND) or vice versa in each case.

For the purposes of implementing a highly-symmetrical system the first (Zy1) and second (Zy2) impedance are substantially identical in structure with regard to their electrical characteristics.

To avoid common mode currents between CAN_H and CAN_L the CAN-H line and the CAN-L line are preferably connected via a third impedance (Zx).

Impedances (Zy1, Zy2; Zx) implemented by capacitive components (capacitors) have proven especially effective.

In accordance with the invention a high symmetry is preferably finally achieved by the impedances (Zy1, Zy2; Zx) being in the same component (as an integrated module, i.e. in the same package), especially implemented by what is known as an X2Y capacitor. The use of an X2Y capacitor not only reduces size and thereby costs compared to alternative components. It also advantageously takes up less space on a printed circuit board, which further reduces costs.

The present invention provides an alternative for the first time to filter methods with current-compensated chokes known from the prior art. In addition to the advantages already mentioned it especially features an improved ESD protection of the CAN transceiver circuit (ICs), i.e. varistors or EMC capacitors at the connector pins (CAN_H, CAN_L) become superfluous. The present invention is particularly suitable for the bus system of a motor vehicle.

Other features which are considered as characteristic for the invention are set forth in the appended claims.

Although the invention is illustrated and described herein as embodied in a system for transmission of data on a bus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
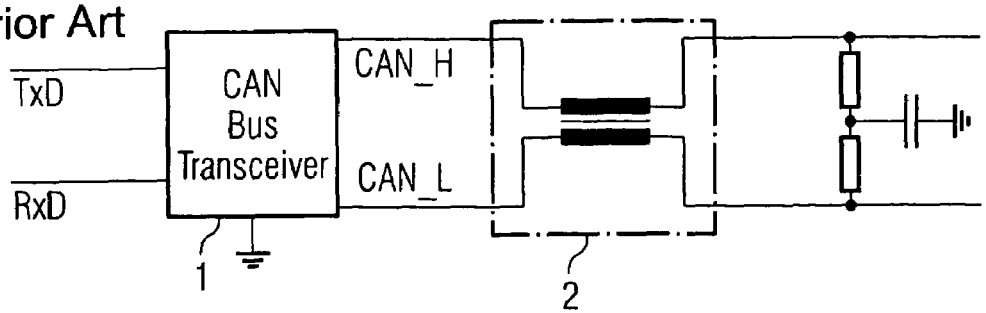
FIG. 1 a schematic diagram of a bus system with a CAN transceiver known from the prior art after which a prior art CAN filter is connected.

Referring now once more to the figures of the drawing in detail, FIG. 1 shows a schematic diagram of a bus system with a CAN transceiver 1 known from the prior art, and a prior art CAN filter 2 connected downstream, in a signal flow direction.

Figure 2:
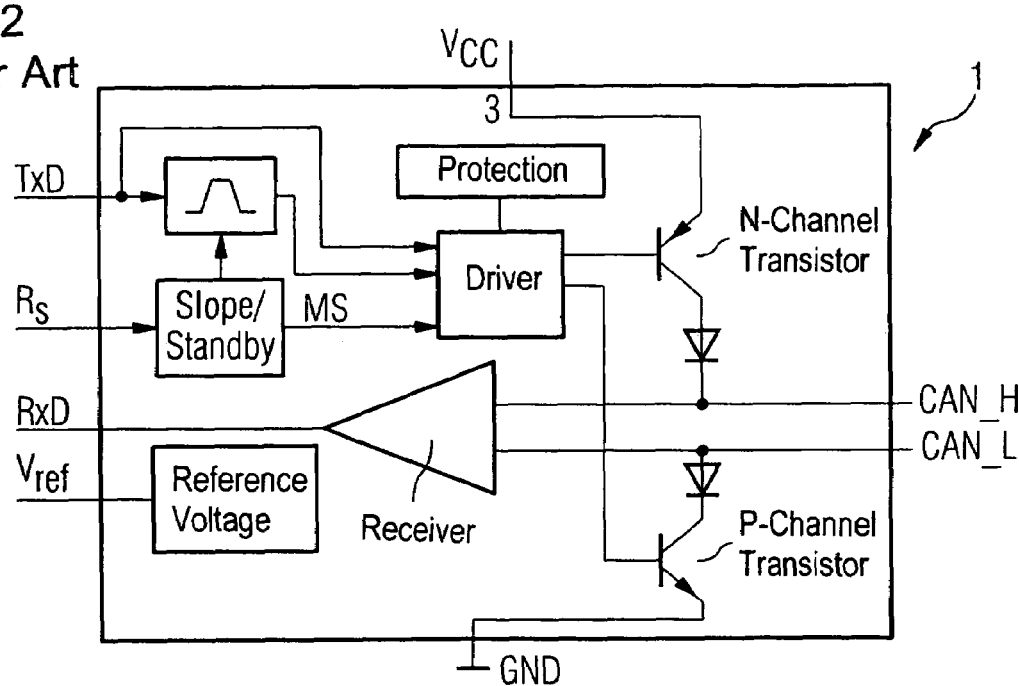
FIG. 2 is an enlarged view of the CAN transceiver from FIG. 1.
Figure 3:
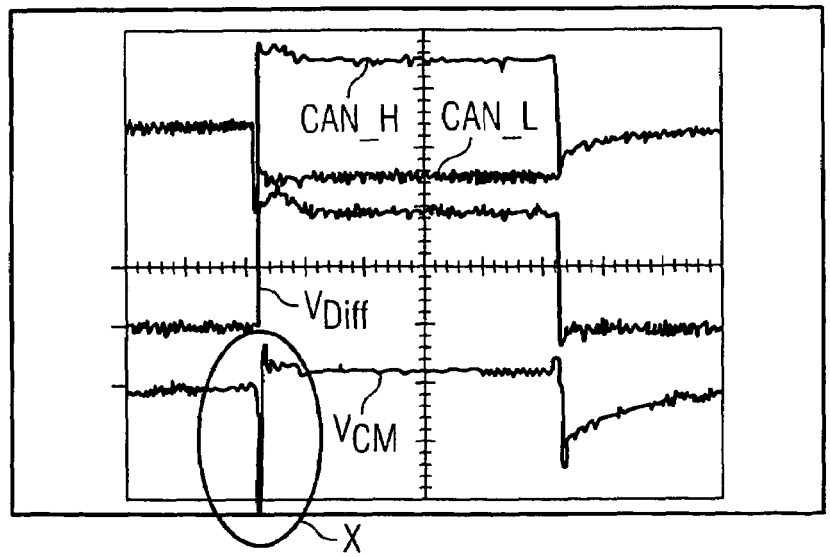
FIG. 3 is a graph plotting the common mode noise of the CAN bus caused by the CAN transceiver in FIG. 2.

FIG. 2 shows the CAN transceiver from FIG. 1 in an enlarged view; FIG. 3 shows the common mode noise on the CAN bus caused by the CAN transceiver shown in FIG. 2.

Figure 4:
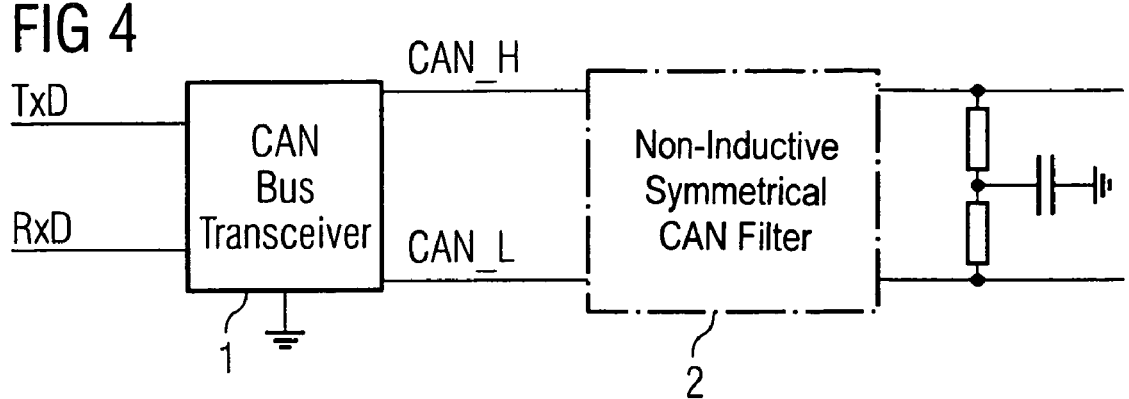
FIG. 4 is a block diagram of a non-inductive configuration of a symmetrical CAN filter according to the invention.

Referring now to the figures of the drawing that pertain to the novel features of the invention and, particularly, to FIG. 4 thereof, there is illustrated a block diagram of a non-inductive design of a symmetrical CAN filter 2. The non-inductivity of the filter 2 has the advantage of an insensitivity to the effects of so-called offset voltages (ground offset) between different CAN users in the network during the CAN bus arbitration. Over and above this the symmetry of the impedances of CAN_H to ground and CAN_L to ground are equally decisive and advantageous for the filter effect for suppressing the common mode noise on the bus.

Figure 5:
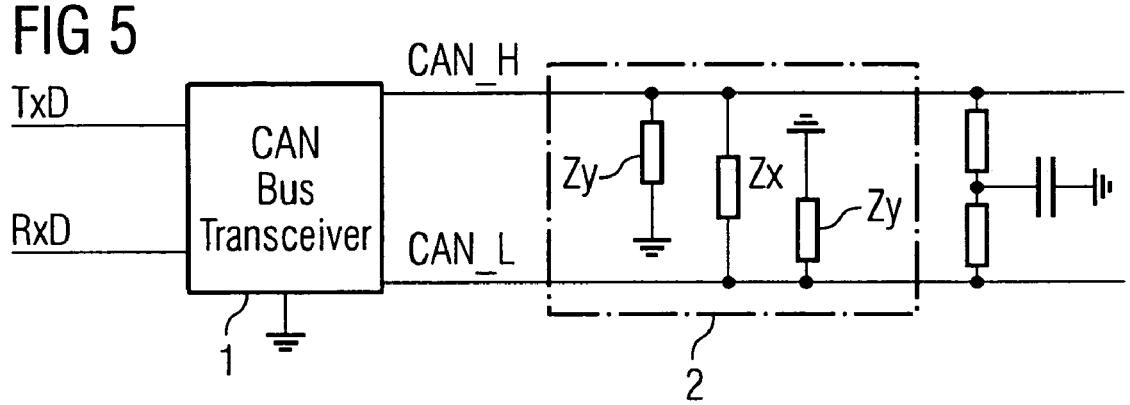
FIG. 5 is a schematic block diagram of a first exemplary embodiment of a non-inductive configuration of a symmetrical CAN filter.

In this regard FIG. 5 shows a first exemplary embodiment of a non-inductive design of symmetrical CAN filter 2. Preferably the first Impedance (Zy1) shorts the CAN-H line and the second impedance (Zy2) shorts the CAN-L line to ground (GND) or vice versa in each case.

Furthermore, for the purposes of implementing a highly-symmetrical system, the first (Zy1) and second (Zy2) impedance are essentially identical in structure with regard to their electrical characteristics.

It can be clearly seen how, to avoid common mode currents between CAN_H and CAN_L., the CAN_H line and the CAN_L line are preferably connected via a third impedance (Zx).

Impedances (Zy1, Zy2; Zx) implemented by capacitive components (capacitors) have proven especially effective.

Figure 6:
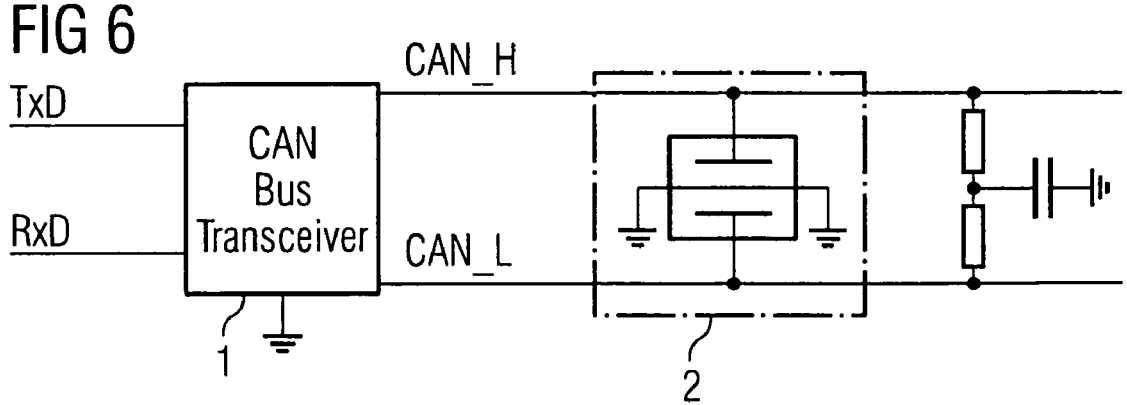
FIG. 6 is a schematic block diagram of a second exemplary embodiment of a non-inductive configuration of a symmetrical CAN filter.

As shown in FIG. 6 with reference to a second exemplary embodiment of a non-inductive design of symmetrical CAN filter 2, in accordance with the invention a high level of symmetry is achieved by the impedances (Zy1, Zy2; Zx) being in the same component as an integrated module, i.e. in the same package, especially by what is known as an X2Y capacitor 2. The use of an X2Y capacitor not only reduces size and thereby costs compared to alternative components. It also advantageously takes up less space on a printed circuit board, which further reduces costs.

The above-described invention provides an alternative for the first time to filter methods with current-compensated chokes 2 known from the prior art. In addition to the advantages already mentioned, it exhibits improved ESD protection of the CAN transceiver circuit (ICs) in particular, i.e. varistors or EMC capacitors at the connector pins (CAN_H, CAN_L) become superfluous.

The present invention is particularly suitable for the bus system of a motor vehicle.

We claim:

1. A system for transmitting data between a transmitter and a receiver on a communication network connecting a plurality of components, comprising:
    at least one transmitter for transmitting data on the communication network;
    a CAN bus transceiver connected following said at least one transmitter in a signal flow direction and configured to convert logic signals into bus data signals; and
    a symmetrical CAN filter connected following said CAN bus transceiver in the signal flow direction, said CAN filter having a non-inductive configuration and including at least two impedances, wherein said at least two impedances include a first impedance shorting a CAN-H line to ground and a second impedance shorting a CAN-L line to ground.

2. The system according to claim 1, wherein said CAN bus transceiver and said CAN filter are disposed in a motor vehicle and are connected in a CAN bus of the motor vehicle.

3. The system according to claim 1, wherein said first and second impedances are structured identically with regard to an electronic characteristic thereof.

4. The system according to claim 1, which comprises a third impedance connecting the CAN_H line and the CAN_L line.

5. The system according to claim 4, wherein said first, second, and third impedances are capacitive components.

6. The system according to claim 1, wherein said first and second impedances are capacitive components.

7. The system according to claim 1, wherein said symmetrical CAN filter is an X2Y capacitor.

* * * * *